(12) United States Patent
Hunziker

(10) Patent No.: US 8,696,406 B2
(45) Date of Patent: Apr. 15, 2014

(54) DEVICE FOR BLAST-MACHINING OR ABRASIVE BLASTING OBJECTS

(76) Inventor: Werner Hunziker, Jennins (CH)

(*) Notice: Subject to any disclaimer, the term of this patent is extended or adjusted under 35 U.S.C. 154(b) by 420 days.

(21) Appl. No.: 13/034,550

(22) Filed: Feb. 24, 2011

(65) Prior Publication Data

US 2011/0300780 A1   Dec. 8, 2011

(30) Foreign Application Priority Data

Jun. 6, 2010   (DE) .......................... 10 2010 00 532
Oct. 22, 2010  (DE) .......................... 10 2010 060 134
Oct. 24, 2010  (DE) .......................... 10 2010 060 135

(51) Int. Cl.
B24B 1/00   (2006.01)

(52) U.S. Cl.
USPC .................. 451/38; 451/87; 451/89; 451/99; 451/102

(58) Field of Classification Search
USPC .................. 451/2, 87, 89, 99, 102, 38, 91
See application file for complete search history.

(56) References Cited

U.S. PATENT DOCUMENTS

| | | | | |
|---|---|---|---|---|
| 794,122 | A * | 7/1905 | Rosegarten | 451/91 |
| 1,599,817 | A * | 9/1926 | Hoevel | 451/91 |
| 2,460,918 | A * | 2/1949 | Bodine, Jr. | 451/36 |
| 2,613,482 | A * | 10/1952 | Hamacher | 451/91 |
| 3,053,016 | A * | 9/1962 | Johnston et al. | 451/91 |
| 3,343,304 | A * | 9/1967 | Eppler | 451/99 |
| 3,447,272 | A | 6/1969 | Eppler | |
| 3,514,905 | A * | 6/1970 | James et al. | 451/40 |
| 3,906,672 | A * | 9/1975 | Kobayashi | 451/75 |
| 4,505,077 | A * | 3/1985 | Sheesley et al. | 451/2 |
| 5,127,198 | A * | 7/1992 | Nakayama et al. | 451/82 |
| 5,201,150 | A * | 4/1993 | Kuboyama et al. | 451/88 |
| 5,283,990 | A * | 2/1994 | Shank, Jr. | 451/90 |
| 5,390,450 | A * | 2/1995 | Goenka | 451/75 |
| 5,545,073 | A * | 8/1996 | Kneisel et al. | 451/39 |
| 5,556,324 | A * | 9/1996 | Shank, Jr. | 451/89 |

(Continued)

FOREIGN PATENT DOCUMENTS

| | | |
|---|---|---|
| DE | 10 2005 016 424 B3 | 7/2006 |
| EP | 1 882 551 A2 | 1/2008 |
| JP | 04082668 A * 3/1992 | ............... B24C 3/00 |
| WO | WO 96/16770 A2 | 6/1996 |

OTHER PUBLICATIONS

EP Search Report of Appln. No. 11 40 1559, Jul. 17, 2012.

*Primary Examiner* — George Nguyen
(74) *Attorney, Agent, or Firm* — Antonelli, Terry, Stout & Kraus, LLP.

(57) ABSTRACT

A device (33) for blast-machining or abrasive blasting objects such as structural elements, tools, household objects, pots, pans or the like, has a blast pot (3) for holding a blasting abrasive (35) which is connected via at least one line (21) to a blasting nozzle (24) which extends into a blasting space (1) in which the objects which are to be blasted can be placed. Compressed air is introduced above the blasting abrasive mixture (35) provided in the blast pot (3) by means of a pressure-generating means (43) and the blasting abrasive (35) thus being forced into the blasting space (1), the compressed air conveying via a second line (10) the granular material or the granular material mixture (35) and/or a suspension formed from granular material and liquid out of the blasting space (1) and back into the blast pot (3), which also takes the form of a pressurized space.

14 Claims, 6 Drawing Sheets

(56) References Cited

U.S. PATENT DOCUMENTS

| | | | |
|---|---|---|---|
| 5,660,580 A * | 8/1997 | Lehnig | 451/38 |
| 5,704,825 A * | 1/1998 | LeCompte | 451/102 |
| 5,795,626 A * | 8/1998 | Gabel et al. | 427/458 |
| 5,800,246 A * | 9/1998 | Tomioka | 451/2 |
| 5,827,114 A * | 10/1998 | Yam et al. | 451/75 |
| 5,857,900 A * | 1/1999 | Shank, Jr. | 451/102 |
| 6,059,641 A * | 5/2000 | Okamoto | 451/99 |
| 6,283,833 B1 * | 9/2001 | Pao et al. | 451/40 |
| 6,364,748 B1 * | 4/2002 | Zwicker et al. | 451/38 |
| 6,390,898 B1 * | 5/2002 | Pieper | 451/75 |
| 6,719,610 B2 * | 4/2004 | Chou et al. | 451/28 |
| 6,837,775 B2 * | 1/2005 | Anand et al. | 451/38 |
| 8,257,147 B2 * | 9/2012 | Summers et al. | 451/38 |
| 2002/0142709 A1 * | 10/2002 | Massa et al. | 451/102 |
| 2009/0227185 A1 * | 9/2009 | Summers et al. | 451/39 |

* cited by examiner

Fig. 5c
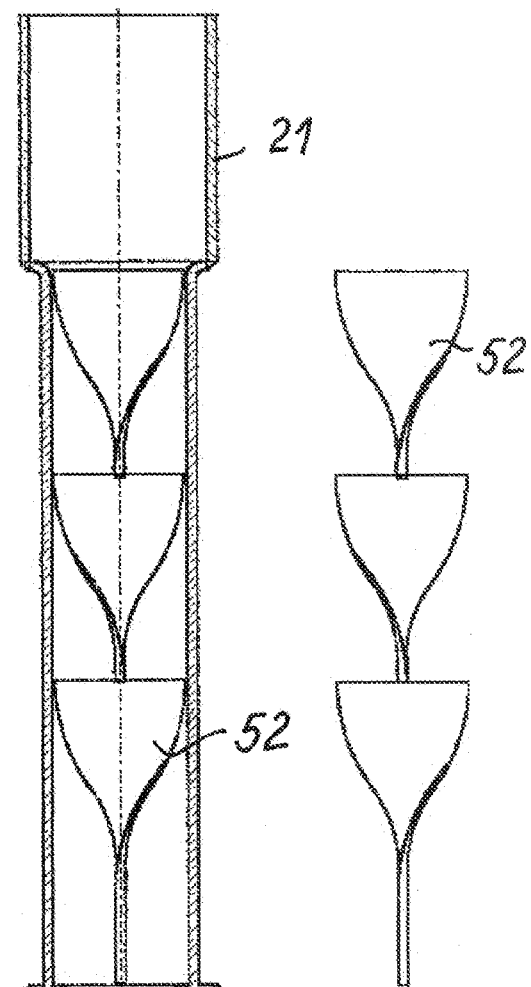
Fig. 5f
Fig. 5d
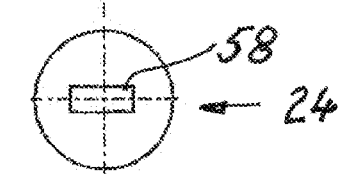

DEVICE FOR BLAST-MACHINING OR ABRASIVE BLASTING OBJECTS

This application claims priority under the provisions of 35 U.S.C. §119 and 37 CFR §1.55, based on German Patent Application No. 10 2010 00 532.0, filed: Feb. 24, 2010 and German Patent Application No. 10 2010 060 134.9, the contents of each of which are incorporated herein in their entireties.

The invention relates to a device for blast-machining or abrasive blasting objects such as structural elements, tools, household objects, pots, pans or the like, having a blast pot for holding a blasting abrasive which is connected via at least one line to a blasting nozzle which extends into a blasting space in which the objects which are to be blasted can be placed.

DE 10 2005 016 424 B3 discloses a cabinet of a dry abrasive blasting system for conveying blasting abrasive. The enclosure has an enclosure part that forms a working space, a cover that at least partially closes the enclosure part at the top and a funnel-shaped base that at least partially closes the enclosure part at the bottom for catching and collecting the blasting abrasive that falls down. The blasting abrasive can be changed quickly and at the same time the enclosure can be equipped with a pressure vessel. For this purpose, the base has a round or oval shape in cross section, with a conical outer surface, with respect to a center axis of the enclosure. This apparatus is relevant only as a compact solution for the dry pressurized abrasive blasting system. In this apparatus, the blasting abrasive is situated in the pressure container and is mixed in the mixing chamber attached underneath with the blasting air that is at a constant pressure. The blasting abrasive is not forced out of the container by the compressed air. The constant pressure allows the blasting abrasive to trickle downward with the stream of air.

Very fine-grained, in particular mineral blasting abrasives such as corundum, silica, glass powder, quartz powder, glass beads etc. can be used for different reasons in dry abrasive blasting processes in only a very limited way. On the one hand, a significant problem with dust has to be overcome and, on the other hand, very fine grains tend to stick to the surface and thus prevent a satisfactory abrasive blasting action.

Processes are also known in which blasting abrasives and water are mixed. This mixture, also known as slurry, is prepared by means of a centrifugal pump, supplied to a blasting gun by means of a pump and then, by means of compressed air, the necessary blasting energy is imparted to the mixture to direct it onto the surfaces which are to be blasted. As the solid constituents of the mixture of water and blasting abrasive sink very quickly, the mixture must be constantly kept in motion. In many cases, for this purpose part of the suspension conveyed by the pump is diverted off and prepared in a special container that has a mixing apparatus.

Centrifugal pumps are prone to a high degree of wear. The blasting result (FIG. 3) with the injector blasting gun is not optimal as only a small central area is heavily blasted and the surrounding annular area is blasted significantly less heavily. In order to enlarge the central area, large nozzles are therefore used, but this results in a large amount of compressed air and thus a high energy consumption.

Trials with higher-output pumps which have a significantly higher pressure, in order to create a suspension or a water and blasting abrasive mixture and blast the objects with it, failed to improve the result.

The use of such a pump is highly disadvantageous as all of the elements that are exposed to wear have to be manufactured from polyurethane. The higher the pressure of this pump, the greater the wear and the lower the overall efficiency.

The poor blasting result is caused in particular by the fact that water and blasting abrasive, in particular the granular material, have different flow rates and these rise further when the delivery pressure of the pump is increased. The blasting result according to FIG. 3 can not be improved significantly as the water strikes the product to be blasted at a significantly higher speed than the granular material. This also causes the mixer to press the granular material outward on one side in the direction of the line wall and the water to be discharged from the nozzle at a higher speed and the granular material to strike only punctually a small area of the product to be blasted.

A device of this type is advantageous in particular for a uniform good distribution of the blasting abrasive mixture in the delivery line and in the region of the discharge end of the blasting nozzle. Moreover, the production of the known device with a special pump for delivering the blasting abrasive mixture or a suspension is elaborate and expensive and requires a high expenditure of energy.

The object of the invention is to produce a device for blast-machining or abrasive blasting objects in a simple and cost-effective manner, to reduce the expenditure of energy and to achieve a uniform distribution of the blasting abrasive mixture on the surface of a product or object to be blasted.

The object is achieved according to the invention by the compressed air being introduced above the blasting abrasive mixture provided in the blast pot by means of a pressure-generating means and the blasting abrasive thus being forced into the blasting nozzles and so into the blasting space, the compressed air conveying the granular material or the granular material mixture and/or a suspension formed from granular material and liquid via a second line out of the blasting space and back into the blast pot, which also takes the form of a pressurized space. As a result, the delivery pump which was previously necessary can be dispensed with as the suspension formed from a liquid, in particular water, and granular material is no longer moved via the known delivery pump but only via compressed air through the delivery line, so that the previously prepared suspension in the blast pot is conducted through the delivery line in a uniformly distributed manner. The compressed air is not provided in the abrasive blasting system but by an external stationary compressor which can at the same time also be used for other processes, in other words does not only need to be designed for an abrasive blasting system.

A uniform distribution of the blasting abrasive in the liquid is very important if good performance is to be achieved. It is therefore advantageous in the device according to the invention to provide a mixer which generates centrifugal forces that are as small as possible, in particular a static mixer or a mixer with a stirrer and drive device. The mixer provided in the blast pot loosens the granular material collected in the lower region of the container of the blast pot. A screw conveyor arranged vertically in the pressure container can, after the system has been idle for a relatively long period of time, also be readily started up again in the completely settled blasting abrasive. A thorough and lasting mixing is achieved with the aid of the return line to the pressure container as this return line opens out below the minimum level of the blasting mixture. As a result, in each recovery cycle the suspension flows into the reservoir present in the pressure container and effects a perfect swirling of the blasting mixture without the use of centrifugal force.

With a thoroughly mixed suspension, a uniform surface is obtained during the abrasive blasting procedure on that part of the area which is blasted. The spray pattern that is normal with injection blasting, with an intensively blasted core zone and a poorly blasted annular zone does not occur with the process according to the invention. The process also allows the use of nozzles which generate a fan-shaped spray and thus allow optimal adaptation to each blasting task.

As the compressed air serves only to force the suspension out of the blasting nozzles and to transport the blasting mixture back into the pressure container and thus is not involved in the blasting process, savings of up to 80% on energy costs can be made with the system according to the invention.

By means of the device according to the invention, it is also possible to dispense with the centrifugal mixer which was previously normally used and which also contributes to uniformly mixing the suspension. As the expenditure of energy for generating the required working pressure in the device is now supplied by an external compressor and a delivery stream of air is thus conducted into the line, with its help the uniformly distributed suspension also passes to the outlet end of the blasting nozzle, a significantly larger working area can be uniformly treated on the surface of the object to be blasted. A uniform blast-machining of the surface is ensured even when blasting nozzles are used with a wider spread of the nozzle spray.

By means of the device according to the invention, objects can be roughened, stripped, deburred, delustered or polished. For this purpose, a suspension of a liquid and a mineral blasting abrasive is used. Machining tools, measuring tools, precision engineering products and also household objects can thus be treated.

As a result, a very thorough mixing of the suspension is achieved, in other words finely distributed solids, such as granular material, are slurried in a liquid, and thus a significantly improved blasting performance is achieved, in other words the surface is treated considerably more uniformly and intensively than with the known blasting patterns as the suspension also has a high degree of kinetic energy because of the thorough mixing of liquid, in particular water, and granular material, which was not possible in dry abrasive blasting processes. When the system according to the invention and the process according to the invention are used, up to 80% of the energy costs can be achieved with a greater performance at the surface.

For this purpose, it is advantageous that the system consisting of the blasting space and at least the blast pot is designed as a closed pressurized system to which in operation a working pressure, in particular gas or compressed air, is applied which at least in the working process and at least in the blast pot acts on the suspension formed from a liquid and a blasting abrasive and/or on the granular material and/or on the granular material mixture and effects a perfect swirling of the mixture with the aid of the stream of air so that at the outlet end of the blasting nozzle the complete kinetic energy is supplied to the blasting abrasive and thus a uniform abrasive blasting is imparted to the surface of the product to be blasted (FIG. 4).

An additional possibility, according to a further development of the invention, is that the system, in particular the blast pot and/or the blasting space, is connected to the pressure-generating means or compressor and/or a compressed-air supply line, wherein, to deliver the granular material mixture formed from a blasting abrasive, in particular granular material, and/or the suspension, the pressure medium line is provided with an inlet side which extends in the working process into the granular material mixture provided in the blast pot and/or the suspension on which the compressed air acts, the outlet end of the pressure medium line having one or more blasting nozzles which are placed in the blasting space.

It is moreover advantageous that the blasting space has in its lower region a collecting space, in particular one or more pressure sluices, in which the granular material mixture used for the blasting is caught and into which extends an inlet end of the return line which is connected to the blast pot, the outlet end being situated in the lower region of the blast pot or extending in the working process below the level of the blasting mixture held in the blast pot.

It is also advantageous that the blasting space has a first and a second sensor in the lower region, in particular in the region of the pressure sluices, the first or upper sensor signaling the maximum permitted filling height and the second or lower sensor signaling the minimum lower filling limit, while the blast pot also has a third sensor in the lower region and a fourth sensor in the upper region, the fourth or upper sensor signaling the maximum permitted filling height and the third or lower sensor signaling the minimum filling limit for the suspension or the granular material mixture.

It is advantageous that a mixing apparatus, in particular a stirrer which has a drive device and which extends into the lower region of the blast pot, is provided in the blast pot, the lower region of the blast pot tapering downward and being designed in particular with a funnel shape. It is hereby ensured that the blasting abrasive projected onto the container wall of the blast pot does not stick.

It is of particular importance for the present invention that a sludge separator, in particular a cyclone separator, is associated with the blast pot and is connected to the blast pot via a line that has a valve, in particular a choke valve, or via a secondary circuit, and to the blasting space via a return line. The blasting abrasive is here cleaned in a simple fashion.

It is also advantageous that a line with at least one valve can be connected to the blast pot so that, when the system is operating or starting up, air or—where necessary—water too is supplied in this region. As a result, a very thorough mixing of the blasting abrasive is achieved in a cost-effective manner.

It is also advantageous that one or more blasting nozzles are arranged at the outlet end of the line and are designed as flat, oval and/or round nozzles.

It is moreover advantageous that the process and/or the device has the following features:
a) When the system is operating, the collecting space, in particular the pressure sluice, holds at least as much suspension as is emitted by the blasting nozzles in one work cycle;
b) the pressure sluice is provided beneath the blasting space which tapers in a funnel shape and is equipped with a closable through opening, in particular a switchable valve;
c) the compressed air is introduced into the inside of the pressure sluice via at least one compressed-air inlet and via the through opening;
d) the return line for returning the collected granular material mixture is situated in the lower region of the collecting space, in particular the pressure sluice, in which the inlet side of the return line is provided, via which return line the suspension or the granular material is conveyed back again into the blast pot by excess or reduced pressure in the blasting space or reduced pressure in the blast pot and is there mixed and the suspension is formed from liquid and granular material;
e) the suspension is applied to the blasting space via the line or the pressure pipe and a valve or pinch valve as well as the blasting nozzles.

Also advantageous is a process with the following features:
a) the granular material and the liquid suspension are prepared in the blast pot depending on the operating state by the addition of liquid, in particular water;

b) the mixer provided in the blast pot, in particular a static mixer or a stirrer with a drive device, loosens the granular material collected in the lower region of the container of the blast pot;

c) the lower sensor and upper sensor provided in the blast pot control the filling state in the blast pot and close or open the valve with or without a choke means for partial ventilation during the return of the suspension or the granular material from the blasting space or pressurized space into the blast pot;

d) after the system has been switched to manual or automatic blasting, the collecting space, in particular the pressure sluice, is controlled in a cyclical operation via the closable through opening, in particular the switchable valve, in such a way that, when a minimum level is reached in the collecting space, in particular in the pressure sluice, fresh water is supplied automatically to the blasting space at a specified rhythm, in particular between 1 minute and approximately 3 minutes.

By spraying the suspension, which consists of a liquid, in particular water, and solids distributed uniformly therein, such as roughening, stripping or delustering substances, in particular corundum, silica, glass powder or the like, a perfect surface structure is obtained by abrasive blasting a surface of a workpiece. Smooth or polishing substances, such as glass beads, can also be used.

In the system according to the invention, the compressed air which is normal in most blasting systems is not used to accelerate the grains of blasting abrasive but the compressed air is used solely in the suspension container to generate an excess pressure that forces the suspension out to the blasting nozzles. The compressed air used is also employed in order to convey the mixture from the blasting chamber back into the pressure container again. The mixture is situated in a constant circuit and it must therefore also be ensured that a permanent cushion of compressed air is present on the surface of the suspension.

The blasting process is moreover specified in that a thorough mixing of the two media, liquid and abrasive, is constantly ensured. The thorough mixing is a decisive factor and separation of the blasting abrasive is prevented by the arrangement and design of the system according to the invention.

So that large amounts of the liquid are not evaporated by the compressed air during the blasting, the system is operated in a completely closed circuit. As a result, additives can also be added to the suspension so that in addition to the mechanical action on the surface of the product or workpiece to be treated, a chemical action is also obtained on the surface with the aid of the blasting abrasive.

The suspension which is situated in a continuous main circuit can also be partially supplied to a closed secondary circuit which comprises the cyclone-style sludge separator. An adjustable amount of the water is constantly diverted off for cleaning by means of the secondary circuit. For this purpose, the sludge separator is connected to the blast pot with a vertical sifter. The liquid rises here by means of the excess pressure that exists in the container. The amount that flows off is adjusted by a choke valve in such a way that the lighter particles, in other words impurities, sink more slowly than the blasting abrasive used. These particles are separated out in an unpressurized reverse process in the cyclone-style separator. The cleaned liquid flows back again into the blasting space and thus into the circuit.

It is advantageous if the ratio between water and blasting abrasive is checked periodically and additives added if necessary. For this purpose, it is advantageous if the pressure container is equipped with a switchable valve so that small amounts of suspension can be drawn off.

Depending on the mixing ratio, additives are added and the chemical composition of the blasting mixture thus altered too.

Further advantages and details of the invention are explained in the patent claims and in the description and illustrated in the figures, in which:

FIGS. 5a to 5d show different embodiments of a nozzle, wherein

FIG. 5d shows a section along the line A-B in FIG. 5b, and

Figures 5A, 5E:
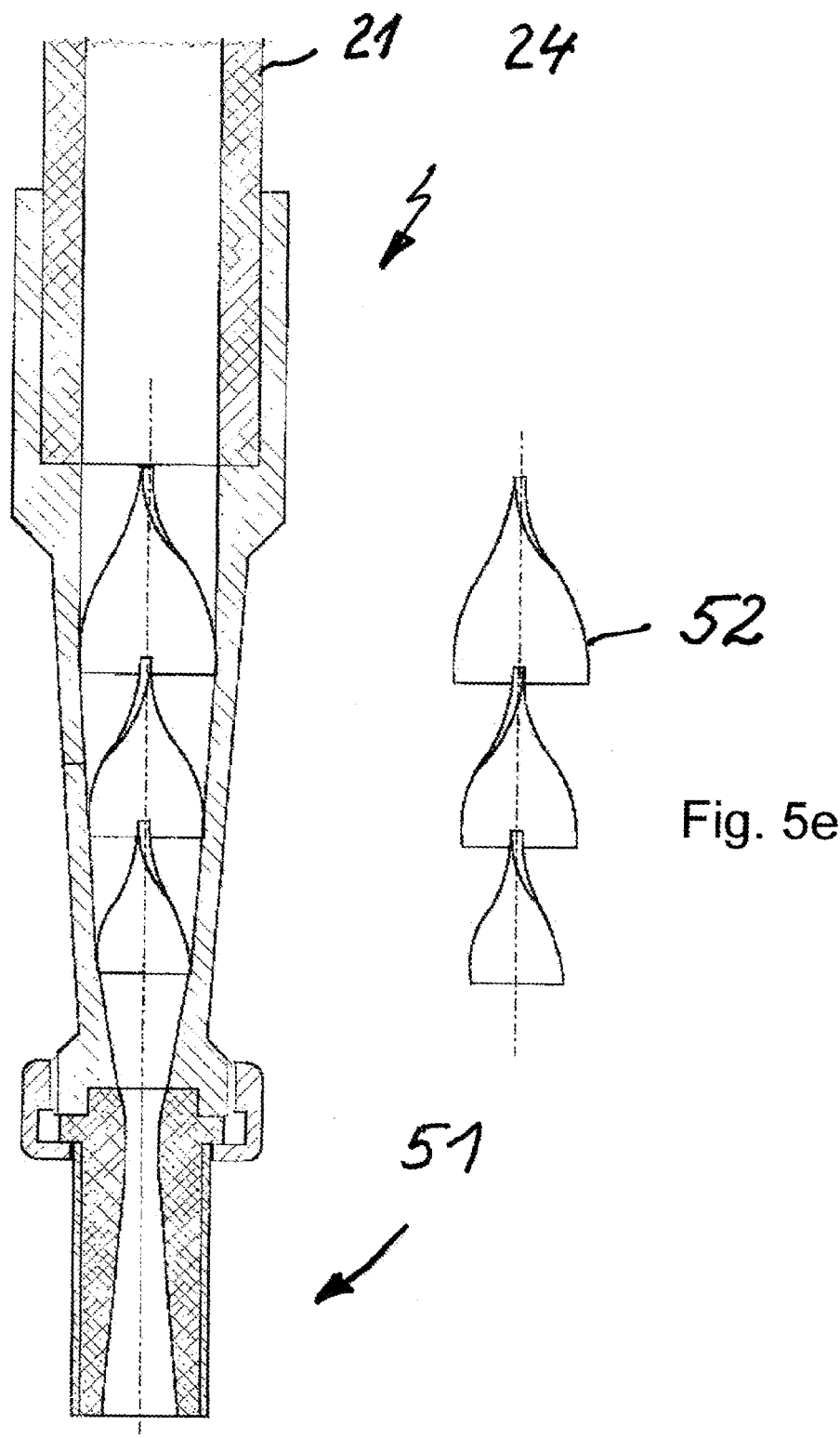

FIGS. 5e+5f show the guiding elements and the static mixer.

Figure 2:
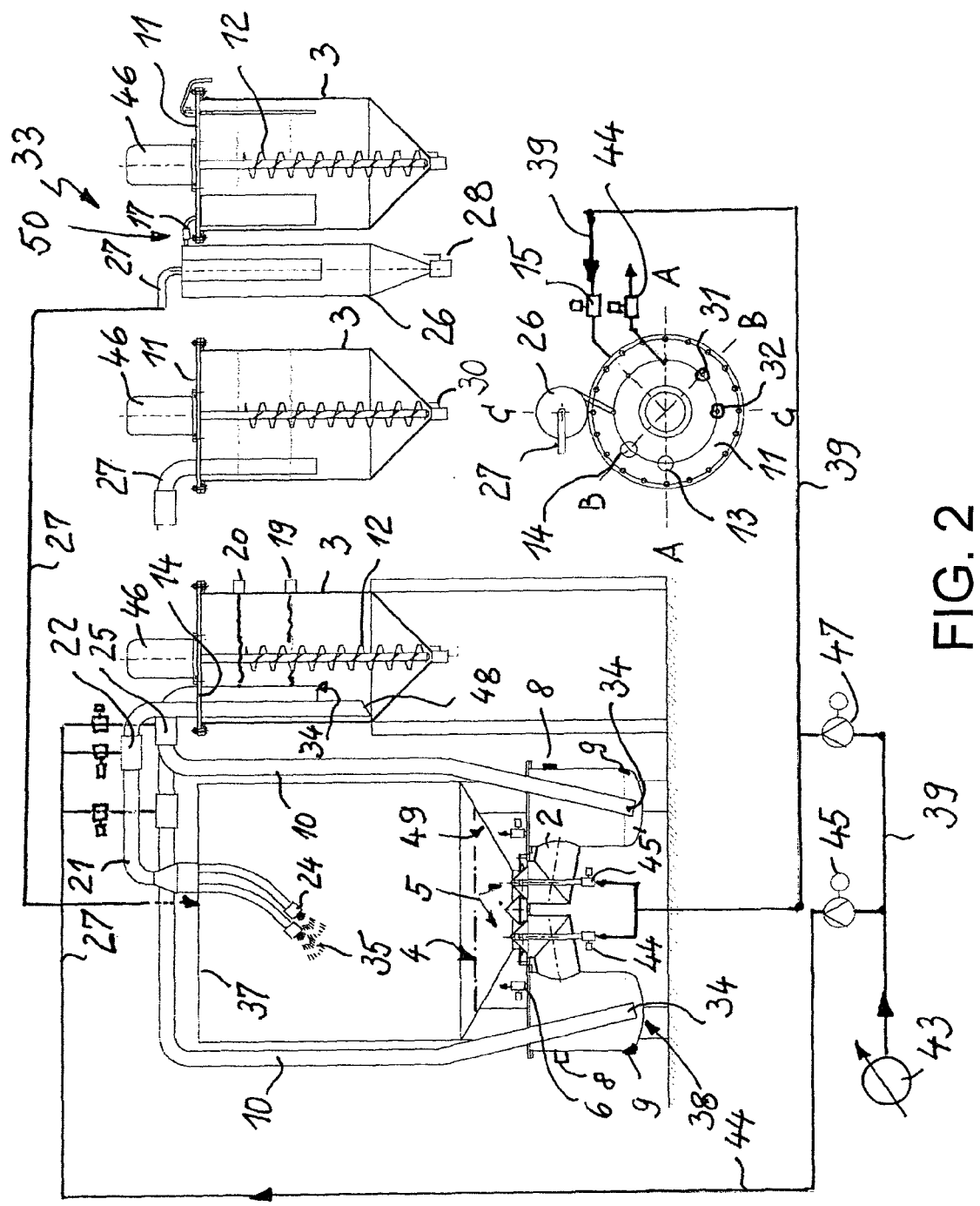
FIG. 2 shows a further exemplary embodiment of a device or a complete system for blast-machining or abrasive blasting objects, similar to that in FIG. 1 seen from the side and partially from above, but with two collecting spaces or pressure sluices that work in parallel, the blast pot being shown in cross section along the lines A-A, B-B and C-C and seen from above.
Figure 3:
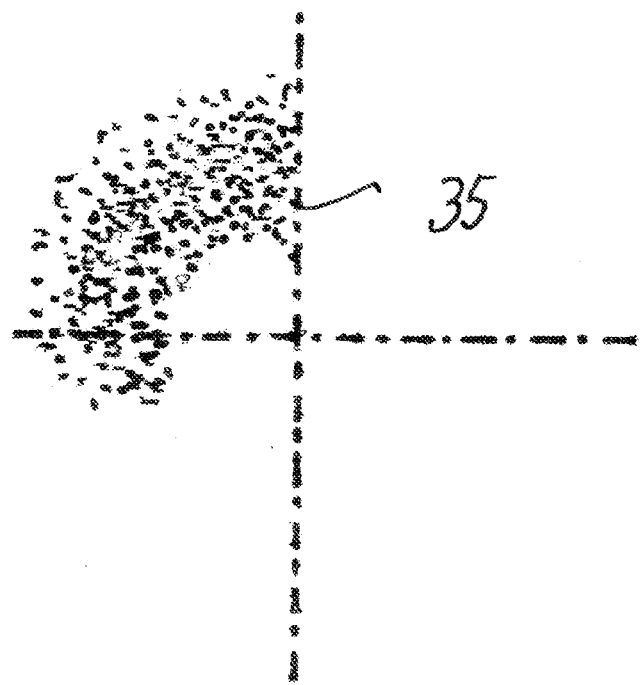
FIG. 3 shows a blasting pattern on the surface of a treated object according to the prior art.

A device 33 for blast-machining or abrasive blasting objects such as structural elements, tools, household objects, pots, pans is shown in FIG. 2 and is provided with a blast pot 3 which serves to hold blasting abrasive 35. The blast pot 3 is shown in Figure in a side view and in a top view so that the connections of the individual lines can be seen better.

The device 33 is associated with a mixing apparatus 52, as described in more detail below, which can be provided in the region of a line 21 of a blasting nozzle 24 or in or upstream of the inlet opening of the blasting nozzle 24.

A blasting space 1 can be designed as a rectangular or alternatively a cylindrical enclosure and be equipped with a cover 37 which is provided with a line connection 29 for a blower (not shown in the drawings) having a water vapor separator. Also, the blast pot 3 for holding blasting abrasive 35 is connected to the blasting space 1 via at least one line 21. The line 21 has, according to FIG. 5, one or more blasting nozzles 24 which extend into the blasting space 1 and by means of which blasting abrasive 35 can be applied to the product to be blasted.

The blasting space 1 can be designed in the lower region as a funnel and be equipped with a sieve 4 which prevents foreign bodies from entering the circuit.

At least one, in particular two, automatically switchable valves 5 are attached to the lower end of the funnel of the blasting space 1 and have a conical valve body that sits loosely on a pipe and is moved upward into a sluice 2 when compressed air flows in through a line 6. If the supply of compressed air is interrupted after the collecting space, in particular the pressure sluice 2, has been vented, the conical valve body falls back onto its valve seat again.

The pressure sluice 2 works in a cyclical operation and must hold the same amount of suspension 35 as is emitted from the blasting nozzle 24 in one working cycle. The sluice can have a different design. Depending on the available space, it can be attached directly beneath the automatic valve 5 or can project laterally.

As mentioned above, the sluice has at least one switchable valve 5 for the inlet of compressed air and at least one switchable valve 7 for the venting.

The blasting nozzles 24 can be designed as round, oval or preferably flat nozzles. If multiple blasting nozzles 24 are provided, then greater efficiency can be achieved.

Figure 5B:
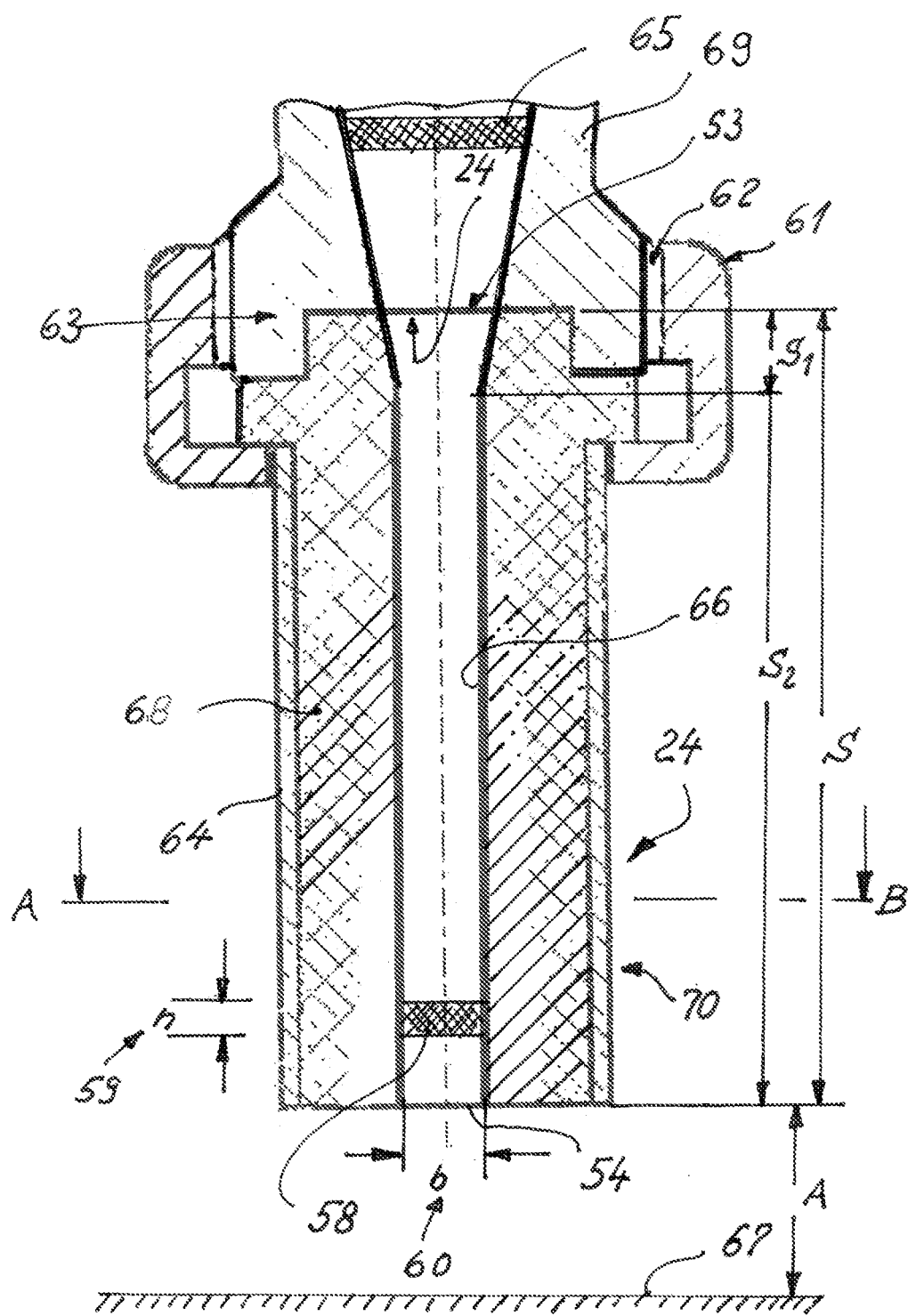

According to an exemplary embodiment in accordance with FIGS. 5a to 5c, the blasting nozzle is connected to the line 21 which can have a round or alternatively other kind of cross section, in a similar way to the blasting nozzle 24. According to FIG. 5a, a continually tapering or conical line piece or nozzle piece, or according to FIG. 5c a line with a cross section of uniform size, is connected to the line 21.

Two further alternatives are shown in FIGS. 5b and 5c, the embodiment according to FIG. 5c being the preferred embodiment. The two embodiments differ only slightly from each other. According to FIG. 5b, the line 21 is conical in design, as in FIG. 5a, while according to the embodiment in FIG. 5c the line 21 or the line part has a cross section of uniform size over its entire length.

The blasting nozzle 24 consists of a nozzle core 68 with a casing 64 and has a nozzle channel 66 that has an inlet opening 53 and an outlet opening 54. Over the entire distance $S_2$ between the inlet opening 53 and the outlet opening 54 of the nozzle channel 66, the cross section 58 can be constant and its inner walls can run parallel to each other. Moreover, the cross section 58 can be designed to be more or less round, oval or polygonal, in particular rectangular.

The nozzle channel 66 of the blasting nozzle 24 can have a cross section 65 in the inlet region which is greater than a cross section 58 which is the same size over the entire distance $S_2$ of the nozzle channel 66.

According to FIG. 5b, the ratio of the height 59 to the width 60 of the cross section 58 of the nozzle channel 66 can be 1 to 4 or 1 to 3, and in particular is 1 to 2.5.

The height 59 of the cross section 58 of the nozzle channel 66 is between 2 and 6 mm or between 3 and 5 mm, and in particular is approximately 4 mm, and the width 60 of the cross section 58 of the nozzle channel 66 is between 7 and 13 mm or between 9 and 11 mm, and in particular is approximately 10 mm.

The gap A between the outlet end 54 of the blasting nozzle 24 and the point of impact of the blasting abrasive 35 on a surface 67 of the workpiece is approximately between 30 and 70 mm or 40 to 60 mm, and in particular is approximately 50 mm.

The inner surface of the nozzle channel 66 can have a polished or lapped surface and the nozzle core 68 can be formed from a light steel, in particular stainless steel.

Figure 4:
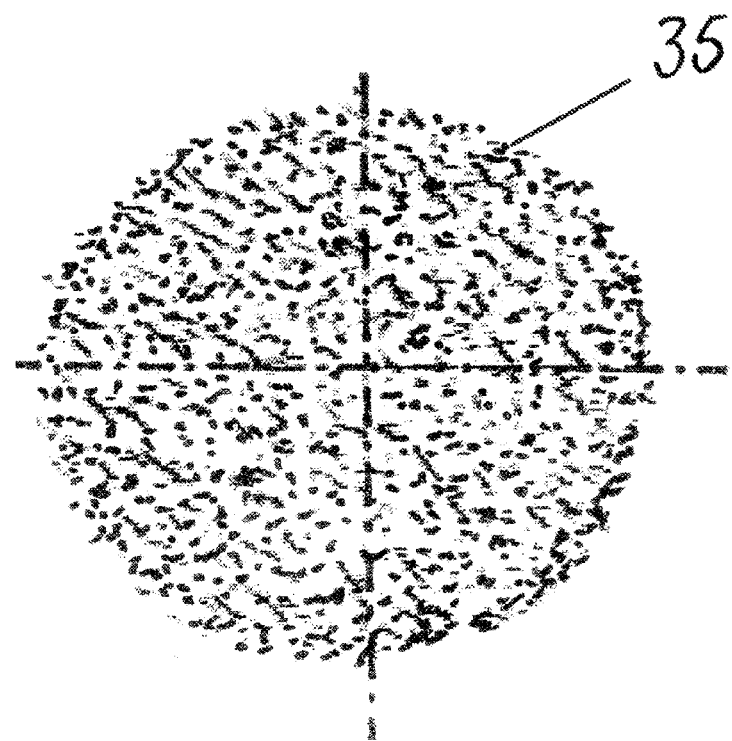
FIG. 4 shows a blasting pattern that is achieved with the device according to the invention.

The blasting nozzle 24 can be designed as a cylindrical round nozzle, as a round nozzle with a conical widened portion 51 or as a flat nozzle. The shape of the blasting nozzle 24 is determined by the type of blasting job. One or more guide elements 52 can be provided in the blasting nozzle 24 which help to improve the blasting pattern according to FIG. 4 and ensure that the liquid and granular material are mixed even more intensively. The guide elements 52 can consist of individual helical elements which can be either connected or welded or interlocked rigidly with each other. The blasting nozzle 24 and/or the guide elements 52 are designed in such a way that they can be easily replaced.

According to a further alternative, a line 72 with at least one valve 74 can be connected to the lower part of the blast pot 3 so that air or, if necessary, water too can be supplied in this region when the system is operating or starting up so that the collected mixture is swirled there in the blast pot 3 and thus as a whole mixed even more thoroughly. While the process is running, the line is closed again via the valve 54 either by hand or by a control command of a computer that is not shown in the drawings. Excess air can, if necessary, be discharged from the system by means of a valve that is not shown in the drawings.

Depending on the embodiment, the mixer 12 can also be dispensed with and the suspension mixed as described only by means of air.

It is moreover advantageous if the system operates with an internal water circuit and a diaphragm pump is used that lies outside the vessel and is not shown in the drawings.

In this arrangement, the pump draws in the water, the inlet side 48 of the line 21 being provided in the pressure vessel only just below the minimum level.

When the system is started up, it operates with clear water and after it has been operating for a relatively long time it has the lowest concentration of blasting abrasive. The pressure line 21 can be guided to the lowest point inside the pressure vessel 3.

This system can operate independently of the pressure conditions, in other words it functions independently of whether the pressure vessel 3 is pressurized or not.

The system operates in a completely reliable manner with the aid of an appropriate control unit. Even after the system has not been operating for a few hours, it can be started at any time without the need for any special precautions. After it has been idle for a few days, it is advantageous if the pump runs for about an hour and the suction line lies in the clear water so that the pump and the pipe connectors are rinsed with clear water.

The use of a diaphragm pump affords optimum results. Even when the system has been idle for a week, a thorough mixing of the blasting abrasive is achieved again after just a few minutes. The system is consequently very uncomplicated and cost-effective and above all is subject to very little wear.

A steel, ceramic, tungsten carbide, boron carbide or polyamide nozzle can be introduced into the nozzle holder and secured to the line 21 by means of a fastening means, in particular a union nut 61.

A static mixer which directs the blasting abrasive alternately to the left and to the right can also be integrated into the nozzle holder. It is advantageous if at least three mixer elements are used which it must be possible to replace easily as they are prone to a high degree of wear. The mixer can thus be designed in such a way that it can be withdrawn from the line 21 after the blasting nozzle 24 has been removed.

The stream of suspension is split into many streams by the mixer and swirled alternately to the left and to the right. For this purpose, it is advantageous if at least three mixing elements are introduced into the mixer. These can be combined or welded to one another to form an assembly and then be incorporated. As the mixing elements are prone to a certain degree of wear, it is advantageous if they can be replaced easily.

The pressure vessel 3 for accommodating the mixer 12 can be conical in design in the lower region. As a result, the suspension accelerates as it moves continually downward during the mixing procedure.

The blasting abrasive 35 is forced into the blast pot 3 by means of a pressure-generating means 43. The pressure-generating means 43 can be a compressor which is connected to a cover 11 of the blast pot 3 via a pressure line 39 and a switching valve 15 and compressed air is supplied to the system and the blast pot 3 so that the blasting mixture 35 is supplied via the line 21 to the blasting space 1 and forced into the latter.

A second line 10 is also provided which supplies the granular material or the granular material mixture and/or a suspension formed from granular material and liquid from the lower region of the blasting space 1 or from a collecting space, in particular the pressure sluice 2, connected to the blasting space 1 into the blast pot 3 which is also designed as a pressurized space. The second line 10 has for this purpose a first inlet side 34 which ends shortly before a lower base 38 of the pressure sluice 2 and thus is immersed constantly in the granular material mixture ejected from the blasting nozzle 24 so that the compressed air can thus convey the granular material mixture back into the blast pot 3 when the system is operating.

The system that consists of the blasting space 1 and at least the blast pot 3 is designed as a closed pressurized system to which during operation a working pressure, in particular gas or compressed air, is applied which at least in the blast pot 3 constantly acts on the suspension formed from liquid and blasting abrasive and/or on the granular material and/or on the granular material mixture. It is also thereby ensured that the compressed air does not mix with the granular material mixture but serves only as a conveying means.

The sluice 2 of the blasting space 1 has in the lower region a first sensor 8 and a second sensor 9, the first or upper sensor 8 signaling the maximum permitted filling height and the second or lower sensor 9 signaling the minimum lower filling limit, while the blast pot 3 also has a third sensor 19 in the lower region and a fourth sensor 20 in the upper region, the fourth or upper sensor 20 signaling the maximum permitted filling height and the third or lower sensor 19 signaling the minimum filling limit for the suspension or the granular material mixture.

A mixing apparatus, in particular a stirrer 12 which has a drive device 46 and which extends into the lower region of the blast pot 3, is provided in the blast pot 3, the lower region of the blast pot 3 tapering downward and being designed in particular with a funnel shape. A switching valve, in particular a manual valve 30, via which the blast pot 3 can be emptied is situated in the funnel-shaped part 49 of the blast pot 3.

A sludge separator, in particular a cyclone separator 26, is associated with the blast pot 3 and is connected to the blast pot 3 via a line 17 or a secondary circuit, and to the blasting space 1 via a return line 27 so that cleaned liquid, in particular water, can be supplied, back to the blasting space 1.

According to FIG. 2, the system can be equipped with two or more pressure sluices 2 in order to improve the reliability and efficiency of the system.

Figure 1:
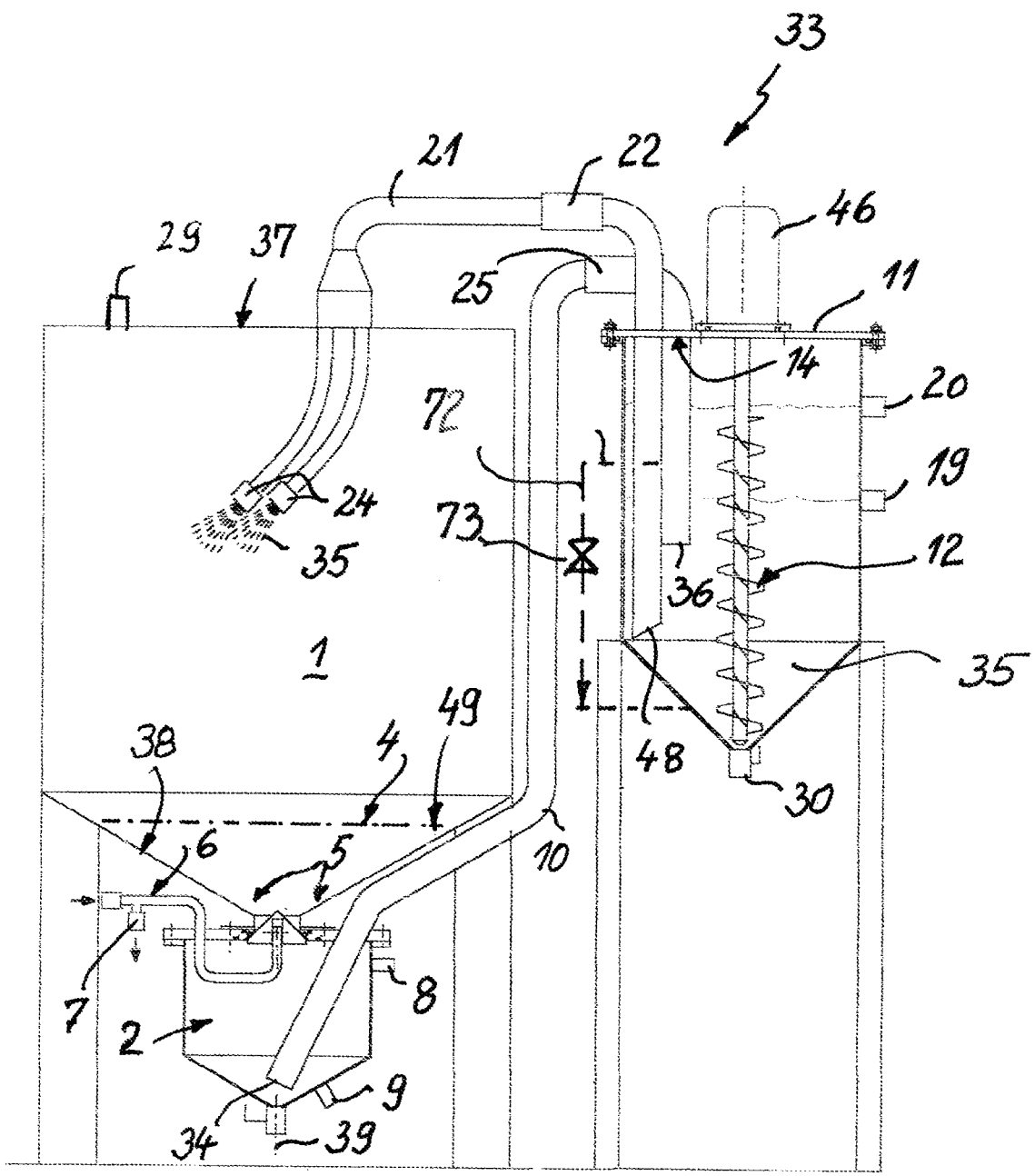
FIG. 1 shows a first exemplary embodiment of a device for blast-machining or abrasive blasting objects such as structural elements, tools, household objects, pots, pans or the like, having a blast pot for holding blasting abrasive.

The system and the blasting space 1 operate as follows:

When only the pressure sluice 2 according to FIG. 1 is used, the connection between the pressure container 3 and the pressure sluice 2 must be interrupted by the pinch valve 25 and the valve 6 for the filling procedure. The valve, in particular the vent valve 44, must be opened for a short period of time, which entails a small loss of compressed air. When the pressure sluice 2 is used, the filling level in the pressure vessel 3 fluctuates depending on the volume of the blasting abrasive in the pressure sluice 2.

When a system is equipped with two pressure sluices 2, the level in the pressure sluice 2 changes only slightly. The amount of the suspension that flows out through the blasting nozzles 24 is continually transported back via the pressure sluices 2. Depending on the operating conditions, one pressure sluice 2 is always coupled to the pressure vessel 3, while the other pressure sluice 2 can be filled. The collecting space 1, in particular one or more pressure sluices 2, are connected to the cover 11 of the blast pot 3 via the line 39 and the switching valve, in particular an electromagnetic switching valve 15. The compressor 43 is connected to the line 39.

A further switching valve 16 can be connected if necessary to the pressure container in order to be able to create a build-up of pressure in the system which is normally effected via the line 39 connected to the collecting space, in particular the pressure sluice 2, said line 39 being equipped for this purpose with switching valves 45, 47. The switching of the valve 5 is the same in the examples according to FIGS. 1 and 2. The line 39 and the valve 45 as well as a line 44 are connected to the upper cover 37 of the blasting space 1 in order to increase the pressure during the working process.

Normally the filling level in the pressure container changes only slightly as the amount of suspension that has been introduced and the amount of suspension that is transported back to the blast pot 3 are more or less the same. Depending on the operating conditions, it is also possible to feed the blasting abrasive directly to the blasting nozzle 24 from the collecting space, in particular the pressure sluice 2. It is, however, advantageous to use the blasting mixture from the pressure container in order to ensure a constant mixing of the amount of suspension. When the system is switched off, the pressure sluice 2 must hold the entire amount of suspension.

As the solids in the suspension rapidly concentrate in large quantities at the bottom of the container and within a few hours can form a solid mass on the base of the container or the blast pot 3, all connections are provided at the top of the blast pot 3 in the cover 11. Sedimentation occurs in the container only after the system has been switched off so that no blockages can occur in the valves and pipes.

It is advantageous if the pressure sluice is monitored especially in the lower region by means of a control apparatus such as sensors and it is thus ensured that when a disturbance occurs the control apparatus emits an optical and/or acoustic signal and initiates an automatic emptying of the collecting space, in particular the pressure sluice 2.

The pressure container and the blast pot 3 are sealed by means of a solid smooth cover 11. Various fittings and the mount for a mixer or a stirrer 12 having a drive 46 are provided on the cover 11.

The suspension 35 is returned via the line 10 and a connection 14 in the cover 11. When only one pressure sluice 2 is used, the valve 15 is permanently open as the level in the pressure vessel 3 fluctuates. When two pressure sluices 2 are used, the valve 15 remains permanently closed. The build-up of pressure is effected via the line 39 and the valve 15.

It is also possible to extract a sample during the working process by means of a valve 32 provided on the cover 11.

This concentrated arrangement of the connections and control apparatuses on the cover 11 entails that the pressure container has dimensions of different sizes depending on requirements.

In order to clean the liquid in the blast pot 3, an ascending pipe 18 that is connected to the cyclone separator 26 via the line 17 is fastened to the cover 11.

The line 21 has a pinch valve 22 via which the blasting nozzles 24 can be switched on. An identical pinch valve 25 which is provided in the line 10 is connected for the return of the suspension 34 via the line 10.

A relatively slowly rotating screw 42 of the mixer 12 provided in the pressure container can also start working when a solid mass has formed on the base of the blast pot 3. The separating effect of a screw stirrer is less than that of a quickly rotating whisk. However, the permanent mixing is assisted by the fact that the suspension that flows back in the pressure sluice assists the mixing process. The discharge opening 31 in the collecting space, in particular the pressure sluice 2, is therefore provided below the minimum level in the pressure container. The collecting space, in particular the pressure sluice 2, can be emptied via the valve 7 and the cyclone separator 26 via a valve 28 and the deposited sludge can be discharged. Samples can be taken in the working process from the blast pot 3 via a valve 32 provided on the blast pot 3.

REFERENCE NUMERALS 1 blasting space
2 collecting space, pressure sluice
3 blast pot, pressure vessel, pressure container
4 sieve
5 switchable valve
6 line, compressed air inlet
7 valve for emptying or venting the pressure sluice
8 first sensor, upper sensor
9 second sensor, lower sensor
10 return line
11 cover
12 stirrer having a drive device 46, mixer
13 compressed air supply line
14 connection for the return line of the suspension
15 switching valve
16 switching valve
17 line
18 ascending pipe
19 third sensor, lower sensor
20 fourth sensor, upper sensor
21 line, pressure medium line
22 valve, pinch valve
24 blasting nozzle
25 valve, pinch valve
26 cyclone separator
28 valve on cyclone separator
27 return line
29 line connection for a blower having a water vapor separator
30 valve, switching valve, manual valve
31 safety valve
32 valve
33 device for blast-machining or abrasive blasting
34 inlet side of the return line 10
35 blasting abrasive, granular material mixture, suspension
36 outlet end of the return line 10
37 cover
38 base of the collecting space, in particular the pressure sluice 2
39 line, pressure line
40 switching valve
42 stirrer screw
43 pressure-generating means
44 line, valve
45 valve
46 drive device
47 valve
48 inlet side of the pressure line 21
49 funnel-shaped part of the blast pot 3
50 valve, choke valve for the line 17
51 conical widened portion of the blasting nozzle 24
52 mixing apparatus, guide element, static mixer
53 inlet opening
54 outlet opening
58 cross section
59 H=height
60 B=width
61 screw connection, union nut
62 thread
63 sealing element
64 casing
65 cross section
66 nozzle channel with uniform cross section
67 workpiece surface
68 nozzle core
69 nozzle part
70 nozzle part
71 continual or conical tapering of the nozzle channel 66
72 line
73 valve
S total distance
$S_1$ distance
$S_2$ distance
A gap

I claim:

1. A device for blast-machining or abrasive blasting objects such as structural elements, tools, household objects, pots, pans or the like, comprising:
   a blasting space in which the objects to be irradiated can be placed during a working process;
   a pressure chamber abrasive depot for receiving during the working process at least a minimum level of an abrasive comprising at least one of a granular material, a granular material mixture and a granular material in a suspension;
   at least one abrasive blasting nozzle for blasting the abrasive on an article placed in the blasting space during the working process;
   a pressure-generating device configured to provide compressed air into the pressure chamber abrasive depot above the abrasive in the pressure chamber abrasive depot;
   a pressure medium line connecting the pressure chamber abrasive depot to the abrasive blasting nozzle for conveying the abrasive, the pressure medium line having inlet side in the abrasive in the pressure chamber abrasive depot during the working process and an outlet end comprising the at least one abrasive blasting nozzle; and
   a return line connecting the blasting space to a portion of the pressure chamber abrasive depot below the minimum level of the abrasive during the working process through which the abrasive is recycled by means of compressed air.

2. The device as claimed in claim 1, wherein the system consisting of the blasting space and at least the pressure chamber abrasive depot is designed as a closed pressurized system to which in operation a working pressure is applied which at least in the working process and at least in the pressure chamber abrasive depot acts on the abrasive.

3. The device as claimed in claim 1, wherein the system is connected to the pressure-generating device or a compressor and/or a compressed-air supply line.

4. The device as claimed in claim 1, wherein the blasting space has in its lower region a collecting space in which the abrasive is caught and into which extends an inlet end of the return line which is connected to the pressure chamber abrasive depot, the outlet end being situated in the lower region of the pressure chamber abrasive depot or extending in the working process below the level of the abrasive held in the pressure chamber abrasive depot.

5. The device as claimed in claim 4, wherein the blasting space has a first and a second sensor in the lower region, the first or upper sensor signaling the maximum permitted filling height and the second or lower sensor signaling the minimum lower filling limit, while the pressure chamber abrasive depot also has a third sensor in its lower region and a fourth sensor in its upper region, the fourth or upper sensor signaling the maximum permitted filling height and the third or lower sensor signaling the minimum filling limit for the abrasive.

6. The device as claimed in claim 1, wherein a mixing apparatus extends into a lower region of the pressure chamber abrasive depot, the lower region of the pressure chamber abrasive depot tapering downward with a funnel shape.

7. The device as claimed in claim 1, wherein a sludge separator is connected to the pressure chamber abrasive depot via a line that has a valve and to the blasting space via the return line.

8. The device as claimed in claim 1, wherein a line with at least one valve can be connected to the blast pot so that, when the system is operating or starting up, air or—where necessary—water too is conveyed in this region.

9. The device as claimed in claim 1, wherein one or more blasting nozzles are arranged at the outlet end of the pressure medium line and are designed as flat, oval and/or round nozzles.

10. A process for using the device as claimed in claim 4, comprising:
   a) wherein the abrasive comprises granular material in a suspension, and when the device is operating, the collecting space holds at least as much suspension as is emitted by the at least one blasting nozzle in one work cycle;
   b) the collecting space is provided beneath the blasting space which tapers in a funnel shape and is equipped with a closable through opening;
   c) the compressed air is introduced into the inside of the collecting space via at least one compressed-air inlet and via the through opening;
   d) the return line for returning the collected granular material mixture is situated in the lower region of the collecting space in which the inlet side of the return line is provided, via which return line the suspension or the granular material is conveyed back again into the pressure chamber abrasive depot by excess or reduced pressure in the blasting space or reduced pressure in the pressure chamber abrasive depot pot and is there mixed and the suspension is formed from liquid and granular material;
   e) the suspension is applied to the blasting space via the pressure medium line and a valve as well as the at least one blasting nozzle.

11. A process for using the device as claimed in claim 5, comprising:
   a) the granular material and the liquid suspension are prepared in the pressure chamber abrasive depot depending on the operating state by the addition of liquid;
   b) a mixer provided in the pressure chamber abrasive depot loosens the granular material collected in the lower region of the container of the pressure chamber abrasive depot;
   c) the lower sensor and upper sensor provided in the pressure chamber abrasive depot control the filling state in the pressure chamber abrasive depot and close or open the valve with or without a choke means for partial ventilation during the return of the suspension or the granular material from the blasting space or pressurized space into the pressure chamber abrasive depot;
   d) after the system has been switched to manual or automatic blasting, the collecting space is controlled in a cyclical operation via the valve, in such a way that, when a minimum level is reached in the collecting space fresh liquid is supplied automatically to the blasting space at a specified rhythm between 1 minute and approximately 3 minutes.

12. The device as claimed in claim 1, wherein the pressure chamber abrasive depot, the pressure-generating device and the pressure medium line are configured such that the compressed air generated by the pressure-generating device is applied above the abrasive in the pressure chamber abrasive depot to act on the abrasive to force the abrasive through the pressure medium line but such that compressed gas does not mix with the abrasive forced through the pressure medium line.

13. The device as claimed in claim 12, wherein the abrasive comprises granular material in a liquid suspension.

14. The device as claimed in claim 6, wherein the mixing apparatus comprises a static mixer or a mixer with a stirrer and drive device.

* * * * *